United States Patent
Shepard (12)

(10) Patent No.: US 6,712,894 B2
(45) Date of Patent: Mar. 30, 2004

(54) METHOD OF PRODUCING SECURE IMAGES USING INKS COMPRISING MODIFIED PIGMENT PARTICLES

(75) Inventor: Peter H. Shepard, S. Hamilton, MA (US)

(73) Assignee: Cabot Corporation, Boston, MA (US)

( * ) Notice: Subject to any disclaimer, the term of this patent is extended or adjusted under 35 U.S.C. 154(b) by 135 days.

(21) Appl. No.: 09/852,168

(22) Filed: May 9, 2001

(65) Prior Publication Data

US 2002/0185033 A1 Dec. 12, 2002

(51) Int. Cl.[7] ............................ C09D 11/02; B42D 15/00
(52) U.S. Cl. ................. 106/31.6; 106/31.75; 106/31.28; 106/31.9; 283/72
(58) Field of Search ................ 106/31.6, 31.75, 106/31.28, 31.9; 427/7; 283/72; 428/29

(56) References Cited

U.S. PATENT DOCUMENTS

| | | | |
|---|---|---|---|
| 4,014,844 A | 3/1977 | Vidal et al. ............ 260/31.2 R |
| 4,199,489 A | 4/1980 | Short ........................ 260/37 |
| 4,434,010 A | 2/1984 | Ash ......................... 106/291 |
| 4,504,084 A | 3/1985 | Jauch ........................ 283/94 |
| 4,900,611 A | 2/1990 | Carroll, Jr. .................. 428/216 |
| 4,921,755 A | 5/1990 | Carroll, Jr. et al. ......... 428/328 |
| 4,946,509 A | 8/1990 | Schwartz et al. ........... 106/496 |
| 5,059,245 A | 10/1991 | Phillips et al. ............... 106/22 |
| 5,192,609 A | 3/1993 | Carroll, Jr. .................. 428/328 |
| 5,281,261 A | 1/1994 | Lin et al. .................. 106/20 R |
| 5,304,587 A | 4/1994 | Oswald et al. ............. 523/161 |
| 5,324,567 A | 6/1994 | Bratchley et al. ........... 428/195 |
| 5,367,005 A | 11/1994 | Nachfolger ................ 523/403 |
| 5,418,277 A | 5/1995 | Ma et al. ................... 524/520 |
| 5,496,630 A | 3/1996 | Hawrylko et al. .......... 428/328 |
| 5,498,283 A | 3/1996 | Botros et al. ............. 106/22 H |
| 5,545,504 A | 8/1996 | Keoshkerian et al. ....... 430/137 |
| 5,554,739 A | 9/1996 | Belmont ..................... 534/885 |
| 5,569,535 A | 10/1996 | Phillips et al. .............. 428/403 |
| 5,571,311 A | 11/1996 | Belmont et al. .............. 106/20 |
| 5,605,751 A | 2/1997 | Suzuki et al. ............... 428/323 |
| 5,630,868 A | 5/1997 | Belmont et al. ......... 106/31.75 |
| 5,698,016 A | 12/1997 | Adams et al. ............... 106/316 |
| 5,713,988 A | 2/1998 | Belmont et al. ........... 106/31.6 |
| 5,714,993 A | 2/1998 | Keoshkerian et al. ........ 347/95 |
| 5,718,754 A | * 2/1998 | Macpherson et al. ....... 106/413 |
| 5,720,801 A | 2/1998 | Nadan et al. ............. 106/31.16 |
| 5,783,108 A | * 7/1998 | MacKay ................. 252/301.36 |
| 5,803,959 A | * 9/1998 | Johnson et al. .......... 106/31.75 |
| 5,837,045 A | * 11/1998 | Johnson et al. .......... 106/31.85 |
| 5,851,280 A | 12/1998 | Belmont et al. ............. 106/472 |
| 5,853,464 A | 12/1998 | Macpherson et al. ....... 106/316 |
| 5,885,335 A | 3/1999 | Adams et al. .............. 106/316 |
| 5,895,522 A | 4/1999 | Belmont et al. ........... 106/31.6 |
| 5,900,029 A | 5/1999 | Belmont et al. ............... 8/550 |
| 5,914,806 A | 6/1999 | Gordon II et al. .......... 359/296 |
| 5,922,118 A | 7/1999 | Johnson et al. ........... 106/31.6 |
| 5,944,881 A | 8/1999 | Mehta et al. ............ 106/31.28 |
| 5,964,935 A | 10/1999 | Chen et al. .................. 106/401 |
| 5,968,243 A | 10/1999 | Belmont et al. .......... 106/31.65 |
| 5,980,593 A | 11/1999 | Friswell et al. ............... 44/349 |
| 6,013,307 A | 1/2000 | Hauser et al. .................. 427/7 |
| 6,042,643 A | 3/2000 | Belmont et al. ............. 106/472 |
| 6,062,604 A | 5/2000 | Taylor et al. .................. 283/72 |
| 6,068,688 A | 5/2000 | Whitehouse et al. ..... 106/31.65 |
| 6,103,380 A | 8/2000 | Devonport .................. 428/403 |
| 6,221,143 B1 | 4/2001 | Palumbo .................... 106/31.6 |
| 2002/0112833 A1 * | 8/2002 | Beghello et al. ............ 162/140 |

FOREIGN PATENT DOCUMENTS

| | | | |
|---|---|---|---|
| EP | 0 677 556 A2 | 10/1995 | ........... C09B/67/08 |
| EP | 0 688 836 A2 | 12/1995 | ........... C09D/11/02 |
| EP | 0 839 883 A2 | 5/1998 | ........... C09D/11/00 |
| GB | 2 330 842 | 5/1999 | ........... C09B/67/54 |
| JP | 57-21466 | 2/1982 | ........... C09D/11/00 |
| JP | 6-128517 | 5/1994 | ........... C09D/11/02 |
| WO | WO97/47697 | 12/1997 | ........... C09D/11/00 |
| WO | WO99/23174 | 5/1999 | ............. C09C/1/56 |
| WO | WO99/31175 | 6/1999 | ............. C08K/9/04 |
| WO | WO99/38921 | 8/1999 | ............. C09C/1/56 |
| WO | WO99/51690 | 10/1999 | ........... C09B/69/00 |
| WO | WO99/63007 | 12/1999 | ............. C09C/1/56 |
| WO | WO00/05313 | 2/2000 | ............. C09C/3/10 |
| WO | WO00/22051 | 4/2000 | ............. C09C/1/56 |
| WO | WO00/24580 | 5/2000 | ........... B32B/27/20 |
| WO | WO00/43446 | 7/2000 | ............. C08K/9/06 |
| WO | WO00/52102 | 10/2000 | ........... C09B/67/00 |
| WO | WO00/68321 | 11/2000 | ............. C09C/3/10 |
| WO | WO01/25340 | 4/2001 | ........... C09B/67/20 |

OTHER PUBLICATIONS

JP11246806 A to Toyo Ink Mfg. Co. Ltd. Publication Date Sep. 14, 1999 Abstract Only (from Patent Abstracts of Japan).

JP11080636 A to Canon Inc., Publication Date Mar. 26, 1999 Abstract Only (from Patent Abstracts of Japan).

JP11256066 A to Tokai Carbon Co. Ltd., Publication Date Sep. 21, 1999 Abstract Only (from Patent Abstracts of Japan).

JP4214779A to Ishihara Sangyo Kaisha Ltd., Publication Date Aug. 5, 1992 Abstract Only (from Derwent, WPI Acc No. 1992–311136/199238).

"Counterfeit Prevention: The Colour of Money", The Economist, Apr. 29, 2000, pp. 78–79.

* cited by examiner

Primary Examiner—Helene Klemanski
Assistant Examiner—Veronica F. Faison

(57) ABSTRACT

The present invention describes a method of producing an image which is visually distinct from its reproductions. This method comprises the steps of formulating an ink composition comprising a liquid vehicle and at least one modified pigment having attached at least one organic group and applying this ink composition to a substrate. Methods of determining the authenticity of an image and of verifying the date of creation of an image is also described.

11 Claims, No Drawings

METHOD OF PRODUCING SECURE IMAGES USING INKS COMPRISING MODIFIED PIGMENT PARTICLES

BACKGROUND OF THE INVENTION

1. Field of the Invention

The present invention relates to a method of producing an image which is visually distinct from its reproductions. This method comprises the steps of formulating an ink composition comprising a liquid vehicle and at least one modified pigment and applying this ink composition to a substrate. The present invention also relates to methods of determining the authenticity of an image and verifying the date of creation of an image.

2. Description of the Related Art

Recent advances in color copying and printing have put increasing importance on developing new methods to prevent forgery of security documents such as banknotes. While there have been many techniques developed, one area of increasing interest is in identifying printing inks that can be used to create images that cannot be readily reproduced by a color copier or printer.

There have been several approaches to formulating an ink for creating a printed image that is visually distinct from its reproduction. For example, U.S. Pat. Nos. 5,059,245, 5,569,535, and 4,434,010 describe the use of stacked thin film platelets or flakes. Images produced with these pigments exhibit angular metamerism—that is, their color changes depending on the angle in which they are viewed. These pigments have been incorporated into security inks used, for example, in paper currency. These pigments have also been incorporated into plastics applications (see, for example, PCT Publication WO 00/24580).

U.S. Pat. No. 6,013,307 discloses a printing ink that contains a single dye or mixture of at least two dyes which is formulated in order to create the greatest possible metamerism between the formulated ink and a reference ink on the basis of two defined types of illumination. The original image is described as having visually clearly identifiable differences compared to its copy.

Another approach used to produce security documents has been to produce an image that contains a material which cannot be seen by the naked eye but which can be made visible under specific conditions. For example, U.S. Pat. Nos. 5,324,567, 5,718,754, and 5,853,464 disclose the use of Raman active compounds. U.S. Pat. Nos. 5,944,881 and 5,980,593 describe fluorescent materials that can be used in a security ink. Also, U.S. Pat. No. 4,504,084 discloses a document containing an information marking comprised of a first color which is at least partially opaque or visible in infrared light and a second color, which conceals the first color in the visible spectrum, but is invisible to infrared light.

Inks which change upon chemical exposure have also been used for security documents. For example, U.S. Pat. Nos. 5,720,801, 5,498,283, and 5,304,587 disclose ink compositions which are invisible when printed and develop a color upon exposure to bleach. Thus, attempts to alter a document printed with an image from these inks using bleach would be readily apparent.

While these efforts afford printed images which are difficult to reproduce, advances in color copiers and color printers continue to be made. Therefore, a need remains to provide a method of producing images, particularly for security documents, which cannot be easily reproduced and which are visually distinct from their reproductions.

SUMMARY OF THE INVENTION

The present invention relates to a method of producing an image which is visually different from reproductions produced therefrom, which comprises the steps of formulating an ink composition comprising a liquid vehicle and at least one modified pigment having attached at least one organic group and applying the ink composition to a substrate. In one embodiment, the ink composition is an ink jet ink composition.

The present invention further relates to a method of determining the authenticity of an image comprising the steps of (1) measuring the reflectance property of a subject image, (2) measuring the reflectance property of an authentic image, and (3) comparing the results, wherein the authentic image is produced from an ink composition which comprises at least one modified pigment having attached at least one organic group.

The present invention further relates to a method of determining the authenticity of an image comprising the steps of (1) measuring the elemental composition of a subject image, (2) measuring the elemental composition of an authentic image, and (3) comparing the results, wherein the authentic image is produced from an ink composition which comprises at least one modified pigment having attached at least one organic group.

The present invention further relates to a method of verifying the date of creation of an image comprising the steps of (1) measuring the elemental composition of a subject image, (2) measuring the elemental composition of an image created on a known date, and (3) comparing the results, wherein the image created on a known date is produced from an ink composition which comprises at least one modified pigment having attached at least one organic group.

The present invention further relates to a security document comprising a substrate and an image which is visually different from reproductions produced therefrom, wherein the image is produced from an ink composition which comprises at least one modified pigment having attached at least one organic group.

It is to be understood that both the foregoing general description and the following detailed description are exemplary and explanatory only and are intended to provide further explanation of the present invention, as claimed.

DETAILED DESCRIPTION OF THE INVENTION

The present invention relates to a method of producing an image which is visually distinct from its reproductions which comprises the steps of formulating an ink composition and applying the ink composition to a substrate. The ink composition comprises a liquid vehicle and at least one modified pigment having attached at least one organic group. In one preferred embodiment, the ink composition used in the method of the present invention is an ink jet ink composition.

Ink compositions can be categorized into various classifications. These include, for example, printing inks, ultraviolet cure inks, ball-point pen inks, and stamp pad or marking inks. Security inks represent a specific class of ink compositions. In general, a security ink is one that produces an image that is difficult, if not impossible, to reproduce.

Thus, forgeries or reproductions become readily apparent when compared to an original.

In general, an ink composition consists of a vehicle which functions as a carrier and a colorant such as a dye or pigment. Additives and/or cosolvents can be incorporated in order to adjust the ink to attain the desired performance.

The vehicle for the ink compositions used in the method of the present invention may be either an aqueous or a non-aqueous vehicle. Preferably, the vehicle is an aqueous vehicle and the ink composition is an aqueous ink composition. The ink composition used in the method of the present invention is preferably an ink jet ink composition.

Suitable additives may also be incorporated into these ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, ink compositions may also incorporate dyes to modify color balance and adjust optical density. Such dyes include food dyes, FD&C dyes, derivatives of phthalocyanine tetrasulfonic acids, including copper phthalocyanine derivates, tetra sodium salts, tetra ammonium salts, tetra potassium salts, tetra lithium salts, and the like.

The ink compositions used in the method of the present invention include at least one modified pigment having attached at least one organic group. Several pigment types are useful in the ink composition used for the method of the present invention. The pigments to be modified can be, but are not limited to, pigments traditionally used in ink compositions (including ink jet ink compositions), coating compositions (including paint formulations), liquid and solid toners, films, plastics, rubbers, and the like.

The pigments to be modified may be chosen from a wide range of conventional colored pigments. Preferably, the pigment is a white pigment, a black pigment, a blue pigment, a brown pigment, a cyan pigment, a green pigment, a violet pigment, a magenta pigment, a red pigment, or a yellow pigment, or shades or combinations thereof. Suitable classes of colored pigments include, for example, anthraquinones, phthalocyanine blues, phthalocyanine greens, diazos, monoazos, pyranthrones, perylenes, heterocyclic yellows, quinacridones, diketopyrolo-pyroles, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 110, Pigment Yellow 117, Pigment Yellow 128, Pigment Yellow 138, and Pigment Yellow 151. A representative example of diketopyrolo-pyroles include Pigment Red 254. Such pigments are commercially available in either powder or press cake form from a number of sources including, BASF Corporation, Engelhard Corporation and Sun Chemical Corporation. Examples of other suitable colored pigments are described in the *Colour Index*, 3rd edition (The Society of Dyers and Colourists, 1982). Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation.

Other suitable pigments within the scope of the present invention include carbon products such as graphite, carbon black, vitreous carbon, carbon fibers, activated charcoal, and activated carbon. The carbon may be of the crystalline or amorphous type. Finely divided forms of the above are preferred; also, it is possible to utilize mixtures of different carbons.

A preferred set of pigments are those that comprise at least one metal that is not a divalent metal. Examples include, but are not limited to, phthalocyanine pigments containing aluminum, zinc, magnesium, or iron.

The pigments will typically have a wide range of BET surface areas, as measured by nitrogen adsorption. Preferably, the pigment has a surface area equal to or greater than 10 $m^2/g$, and more preferably equal to or greater than and 100 $m^2/g$, thereby corresponding to a smaller primary/aggregate particle size. Such surface areas have been found to provide for a more uniform distribution and efficient level of treating agent on the pigment and a higher percent yield of the modified pigment after post processing techniques. If the preferred higher surface area of the pigment (thereby corresponding to a smaller particle size) is not readily available, it is well recognized by those skilled in the art that the pigment may be subjected to conventional size comminution or reduction techniques, such as ball or jet milling, to reduce the pigment to the desired particle size.

The modified pigment used in the method of the present invention comprises a pigment having attached at least one organic group. The organic group may vary depending on the vehicle used for the ink composition as well as on the desired ink and print performance properties. This allows for greater flexibility by tailoring the pigment to the specific application.

In one preferred embodiment, the organic group comprises an ionic group, an ionizable group, or a mixture of an ionic group and an ionizable group. An ionic group is either anionic or cationic and is associated with a counterion of the opposite charge including inorganic or organic counterions such as $Na^+$, $K^+$, $Li^+$, $NH_4^+$, $NR'_4^+$ acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Thus, in a preferred embodiment, the organic group is an organic ionic group. Organic ionic groups include those described in U.S. Pat. No. 5,698,016, the description of which is fully incorporated herein by reference.

Negatively charged organic ionic groups may be generated from groups having ionizable substituents that can form anions, such as acidic substituents, or may be the anion in the salts of ionizable substituents. Preferably, when the ionizable substituent forms an anion, the ionizable substituent has a $pK_a$ of less than 11. The organic ionic group could further be generated from a species having ionizable groups with a $pK_a$ of less than 11 and salts of ionizable substituents having a $pK_a$ of less than 11. The $pK_a$ of the ionizable substituent refers to the $pK_a$ of the ionizable substituent as a whole, not just the acidic substituent. More preferably, the $pK_a$ is less than 10 and most preferably less than 9.

Representative examples of ionic groups include —$COO^-$, —$SO_3^-$, —$OSO_3^-$, —$HPO_3^-$, —$OPO_3^{-2}$, and —$PO_3^{-2}$. Representative examples of ionizable groups include —$COOH$, —$SO_3H$, —$PO_3H_2$, —$R'SH$, —$R'OH$, and —$SO_2NHCOR'$, where R' represents hydrogen or an organic group such as a substituted or unsubstituted aryl and/or alkyl group. Particularly preferred species are —$COO^-$ and —$SO_3^-$. Preferably, the organic ionic group is generated from a substituted or unsubstituted carboxyphenyl group or a substituted or unsubstituted sulfophenyl group. Specific organic ionic groups are —$C_6H_4CO_2^-$ and —$C_6H_4SO_3^-$.

Positively charged organic ionic groups may be generated from protonated amines which are attached to the pigment. Preferably, an organic group having an amine substituent has a $pK_b$ of less than 5. Positively charged organic ionic group may be quaternary ammonium groups (—$NR'_3^+$) and quaternary phosphonium groups (—$PR'_3^+$), where R' represents hydrogen or an organic group such as a substituted or unsubstituted aryl and/or alkyl group. For example, amines may be protonated to form ammonium groups in acidic media. Quaternized cyclic ammonium ions, and quaternized aromatic ammonium ions, can also be used as the organic ionic group. Thus, N-substituted pyridinium species, such as N-methyl-pyridyl, can be used in this regard. Examples of cationic organic groups include, but are not limited to, -3-$C_5H_4N(C_2H_5)^+$, -3-$C_5H_4N(CH_3)^+$, -3-$C_5H_4N(CH_2C_6H_5)^+$, —$C_6H_4(NC_5H_5^+)$, —$C_6H_4COCH_2N(CH_3)_3^+$, —$C_6H_4COCH_2(NC_5H_5)^+$, —$C_6H_4SO_2NH(C_4H_3N_2H^+)$, —$C_6H_4NH_3^+$, —$C_6H_4NH_2(CH_3)^+$, —$C_6H_4NH(CH_3)_2^+$, —$C_6H_4N(CH_3)_3^+$, —$C_6H_4CH_2NH_3^+$, —$C_6H_4CH_2NH_2(CH_3)^+$, —$C_6H_4CH_2NH(CH_3)_2^+$, —$C_6H_4CH_2N(CH_3)_3^+$, —$C_6H_4CH_2CH_2NH_3^+$, —$C_6H_4CH_2CH_2NH_2(CH_3)^+$, —$C_6H_4CH_2CH_2NH(CH_3)_2^+$ and —$C_6H_4CH_2CH_2N(CH_3)_3^+$. Other substituted or unsubstituted arylene or heteroarylene groups can be used in the place of the $C_6H_4$ groups shown in the structures above. Preferably, the cationic organic group is —$NR'_3^+$ wherein R' is an alkyl group or an aryl group. Another preferred group is —$C_5H_4N$—$R'^+$, wherein R' is an alkyl group such as a methyl group or a benzyl group.

In another embodiment, the organic group attached to the modified pigments used in the method of the present invention may also be polymeric. The attached polymer groups may be present as individual attached chains or as a coating on the pigment, as is described below.

For example, the organic group attached to the modified pigments may comprise a pigment having attached at least one organic group represented by the formula —X-Sp-[Polymer]R, wherein X, which is directly attached to the pigment, represents an aryl or heteroaryl group or an alkyl group and is substituted with an Sp group, Sp represents a spacer group, the group Polymer represents a polymeric group comprising repeating monomer groups or multiple monomer groups or both, and R represents hydrogen, a bond, a substituted or unsubstituted alkyl group, or a substituted or unsubstituted aryl group.. The group Polymer can be substituted or unsubstituted with additional groups. The total number of monomer repeating units that comprise the "polymer" is not greater than about 500 monomer repeating units.

The group Polymer can be any polymeric group capable of being attached to a pigment. Thus, for example, the group Polymer can be a thermoplastic polymeric group or a thermosetting polymeric group. Further, the polymeric group can be a homopolymer, copolymer, terpolymer, and/or a polymer containing any number of different repeating units. Further, the group Polymer can be any type of polymeric group, such as a random polymer, alternating polymer, graft polymer, block polymer, star-like polymer, and/or comb-like polymer. The group Polymer can also be one or more polyblends. The group Polymer can be an interpenetrating polymer network (IPN); simultaneous interpenetrating polymer network (SIN); or interpenetrating elastomeric network (IEN).

For the group Polymer, examples include, but are not limited to, linear-high polymers such as polyethylene, poly (vinylchloride), polyisobutylene, polystyrene, polycaprolactam (nylon), polyisoprene, and the like. Other general classes are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene and polydicyclopentadiene), polyolefin copolymers, polyphenylene oxides, poly(vinyl alcohols), polyurethanes, thermoplastic elastomers, and the like. Preferably at least some of these monomer units of the group Polymer comprise an ionic group, an ionizable group, or a mixture of ionic or ionizable groups.

The group Sp represents a spacer group as described above. Spacer group, as used herein, is a link between two groups and can be a bond, or a chemical group such as, but not limited to, esters such as —$CO_2$— and —$O_2C$—, sulfones such as —$SO_2$— and —$SO_2C_2H_4$—, ketones such as —$C(O)$—, amide derivatives such as —$NRC(O)$—, —$C(O)NR$—, —$NRCO_2$—, —$O_2CNR$—, and —$NRC(O)NR$—, sulfonates, sulfonamides, —$O$—, —$S$—, amines such as —$NR$, imides, arylene groups, alkylene groups, and the like, wherein R, which can be the same or different, represents hydrogen or an organic group such as a substituted or unsubstituted aryl and/or alkyl group.

The group X represents an aryl or heteroaryl group or an alkyl group. X is directly attached to the pigment and is further substituted with an Sp group. The aromatic group can be further substituted with any group, such as one or more alkyl groups or aryl groups. Preferably, the aryl or heteroaryl group is phenyl, naphthyl, anthracenyl, phenanthrenyl, or biphenyl, and the heteroaryl group is pyridinyl, benzothiadiazolyl, or benzothiazolyl. When X represents an alkyl group, examples include, but are not limited to, substituted or unsubstituted alkyl groups which may be branched or unbranched. The alkyl group can be substituted with one or more groups, such as aromatic groups. Preferred examples include, but are not limited to, $C_1$–$C_{12}$ groups like methyl, ethyl, propyl, butyl, pentyl, or hexyl groups. Preferably, X is an aryl group.

The group X may be substituted with one or more functional groups. Examples of functional groups include, but are not limited to, R''', OR''', COR''', COOR''', OCOR''', carboxylates, halogens, CN, NR'''$_2$, SO$_3$H, sulfonates, sulfates, NR'''(COR'''), CONR'''$_2$, NO$_2$, PO$_3$H$_2$, phosphonates, phosphates, N=NR''', SOR''', NSO$_2$R''', wherein R''' which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structures above, the group Polymer is attached to the pigment through the spacer group Sp. However, it will also be recognized that when R represents a bond, the available bond can also be attached to the pigment. In addition, the group Polymer can also be attached to the pigment at multiple points along the polymer chain through proper choice of substituent groups on the repeating monomer units. These substituents may also comprise spacer groups or —X-Sp-groups as described above. Thus, these groups can be attached to the pigment at either end or at points along the backbone. Further, these groups can be any type of polymeric group, such as a random polymer, alternating polymer, graft polymer, block polymer, star-like polymer, and/or comb-like polymer.

As another example, the polymer group attached to the pigment may also be directly attached. Thus, the polymer can be attached either through a covalent of ionic bond. The amount of polymer present on the modified pigments can be high enough to cover a substantial amount of the pigment. Thus, in another embodiment, the modified pigment products used in the method of the present invention comprise a pigment that is at least partially coated with one or more polymeric coatings and can be substantially or fully coated by one or more polymers. The use of the term "coated" includes both partially and fully coated pigments and modified pigments—the polymer partially or fully encapsulates the modified pigment, wherein the modified pigment is the core and the polymer is the shell. The polymer(s) coated onto or used to encapsulate the modified pigment is preferably present on the modified pigment such that the polymer(s) is not substantially extractable by an organic solvent. More preferably, the polymer(s) on the modified pigment is attached by physical (for example, adsorption) and/or chemical means (for example, bonding or grafting).

Further details concerning the polymer coated pigments and methods of making them are set forth in International Published Application No. WO 00/22051, incorporated in its entirety by reference herein.

In another preferred embodiment, the attached organic group is a dye. These attached dye organic groups are similar to those that are traditionally used as colorants in ink compositions. Attached dyes include, but are not limited to, food dyes, FD&C dyes, derivatives of phthalocyanine tetrasulfonic acids, including copper phthalocyanine derivates, tetra sodium salts, tetra ammonium salts, tetra potassium salts, tetra lithium salts, and the like. Attached dyes can, for example, provide the ability to modify color balance and adjust optical density while at the same time maintaining and/or providing pigment stability. These organic groups can also be used as an elemental tag for determining either the authenticity or the date of creation of an image, which will be discussed in more detail below.

The amount of attached organic groups, whether ionic, ionizable, or polymeric, useful in the method of the present invention can be varied in order to attain desired performance attributes, such as dispersibility in the ink vehicle and print waterfastness and smearfastness. In addition, modified pigment products comprising multiple attached organic groups can result in improved properties. In general, the amount of attached organic groups is from about 0.01 to about 10.0 micromoles of organic group per m$^2$ surface area of pigment, as measured by nitrogen adsorption (BET method). For example, the amount of attached organic groups is between from about 0.5 to about 4.0 micromoles per m$^2$.

The modified pigments used in the method of the present invention are modified using methods known to those skilled in the art such that organic groups are attached to the pigment. This provides a more stable attachment of the groups onto the pigment compared to adsorbed groups, such as polymers, surfactants, and the like. For example, the modified pigments used in the method of the present invention can be prepared using the methods described in U.S. Pat. Nos. 5,554,739, 5,851,280, 6,042,643, 5,707,432, and 5,837,045, and PCT Publication WO 99/23174, the descriptions of which are fully incorporated herein by reference.

The modified pigments may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the pigments may be further purified or classified to remove impurities and other undesirable free species which can co-exist in the dispersion as a result of the manufacturing process. For example, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, Na$^+$, K$^+$, Li$^+$, NH$_4^+$, Ca$^{2+}$, Mg$^{2+}$, Cl$^-$, NO$_3^-$, NO$_2^-$, acetate, and Br$^-$.

The ink compositions can be formed with a minimum of additional components (additives and/or cosolvents) and processing steps. The modified pigment is present in the ink compositions in an amount effective to provide the desired image qualities (for example, optical density) without detrimentally affecting the performance of the ink. For example, typically, the modified pigment will be present in an amount ranging from about 1% to about 20% based on the weight of the ink. It is also within the bounds of the present invention to use a formulation containing a mixture of unmodified pigments with the modified pigments described above.

The ink compositions can be further purified and/or classified using methods such as those described above for the modified pigments and dispersions thereof. An optional counterion exchange step can also be used. In this way, unwanted impurities or undesirable large particles can be removed to produce an ink with good overall properties.

As stated previously, the present invention relates to a method of producing an image which is visually distinct from reproductions produced therefrom. The first step of this method comprises formulating an ink composition comprising a liquid vehicle and at least one modified pigment having attached at least one organic group. The ink composition is then applied to a suitable substrate such as paper, coated or laminated paper, card stock, transparent film, textile, or plastic. The ink composition may be applied using conventional processes and include ink jet printing processes such as thermal, piezoelectric, and continuous ink jet printing.

Once applied, the image produced will have an appearance that changes depending upon the angle at which it is viewed. When viewed at an angle perpendicular to the substrate, the image will appear normal—i.e., natural color to the naked eye with no reflections. When viewed at an angle away from the perpendicular, the color of the image will change. For example, if a modified aluminum phthalocyanine (blue) pigment having an attached benzenesulfonate group is used, the image will appear blue when viewed head on (i.e., at a 90 deg angle) yet will appear to have a reddish reflective color when viewed at other angles. If this image is copied, the "red" color will not be seen in the copied image since the ink composition used to produce the copied image is different from that used to produce the original image. In this way, the present invention provides for a method to protect against the forgery or alteration of documents which include at least one image produced by the described method.

The present invention further relates to a security document comprising a substrate and at least one image which is visually different from reproductions produced therefrom. The image is produced from an ink composition which comprises at least one modified pigment having attached at least one organic group, and the visual effect which makes it different from reproductions is the same as described above. The security document can be any document which contains information or images that should not be reproduced. Preferably, the security document is a banknote, a banknote thread, currency, a traveler's check, a certificate, a stamp, a lottery ticket, an ownership document, a passport, an identity card, a credit card, a charge card, an access card, a smart card, a brand authentication label or tag, or a tamperproof label. The substrate of the security document can be any of those known in the art such as, for example, paper, coated or laminated paper, card stock, and plastic. Preferably, the substrate is paper.

The present invention further relates to methods of determining the authenticity of an image comprising the steps of measuring the reflectance property of a subject image, measuring the reflectance property of an authentic image, and comparing the results, wherein the authentic image is produced from an ink composition which comprises at least one modified pigment having attached at least one organic group. The method of measurement of the reflectance properties (for example, angular metamerism) can be any of those known in the art, and, in particular includes simple visual inspection. Thus, for example, an image produced by the method of the present invention can be visually seen as having reflectance properties (as seen, for example, in the gloss or color of the image) which are different from that of a reproduction of the original image. Other more quantitative methods may also be used. In this way, the authenticity of an image produced from an ink composition which comprises at least one modified pigment having attached at least one organic group can be either qualitatively or quantitatively determined.

The present invention further relates to a method of determining the authenticity of an image comprising the steps of measuring the elemental composition of a subject image, measuring the elemental composition of an authentic image, and comparing the results, wherein the authentic image is produced from an ink composition which comprises at least one modified pigment having attached at least one organic group. Any method known in the art for measuring elemental compositions (that is, the type and relative quantity of elements present) may be used. Examples include, but are not limited to, XPS and combustion analysis. For example, an image produced using a pigment having an attached group containing a halogen will have an elemental composition that is different from a copy of that image since the copy was not prepared using the original ink composition. In general, the comparison of the elemental composition of an original image, produced from an ink composition comprising at least one modified pigment having attached at least one organic group, may result in the finding that a) the copy lacks elements present in the original, b) elements are present in the reproduction that are not present in the original, or c) the same elements are present in both the original and the reproduction, but these elements are present in different relative amounts. In this way, the authenticity of an image produced using an ink composition comprising at least one modified pigment can be determined.

In a preferred embodiment, the organic group is a dye. Dyes typically contain elements such as S, N, O, and, in some cases, halogens or metals. These elements may not be present in a reproduction of an image, or, at least, not in the same relative amounts. In addition, dyes can be fluorescent. Thus, an original image would fluoresce under particular wavelengths of light while its reproduction would not.

The present invention further relates to a method of verifying the date of creation of an image comprising the steps of measuring the elemental composition of a subject image, measuring the elemental composition of an image created on a known date, and comparing the results, wherein the image created on a known date is produced from an ink composition which comprises at least one modified pigment having attached at least one organic group. Any method known in the art for measuring elemental compositions may be used. In a preferred embodiment, the organic group is a dye. As a further measure against forgery, a document may be produced on a specific date or range of dates with an image from an ink composition comprising one modified pigment. Then, on subsequent dates, a new ink composition may be used with an ink comprising a different modified pigment—that is, one with a different elemental composition. Attempts to alter either document would be readily apparent upon measuring the elemental composition of an image on that document. Thus, the documents would be "date stamped" in a way that was not visible to the naked eye.

The present invention will be further clarified by the following examples which are intended to be only exemplary in nature.

EXAMPLE

A 2 liter beaker containing 1000 mL of deionized water was heated to 60° C. while stirring at 4000 rpm with an overhead stirrer. To this was added 8.695 g of sulfanilic acid while stirring. A 20% aqueous solution of sodium nitrite (3.45 g of sodium nitrite) was then added, quickly followed by 50 g of aluminum phthalocyanine pigment. The stirring speed was then increased to 8000 rpm, and stirring was continued for 3 hours at 60° C. After this time, the resulting pigment dispersion was allowed to cool to room temperature. The particle size was monitored throughout the process using a Honeywell Microtrac® Particle Size Analyzer. The pigment dispersion contained modified pigment having an attached benzenesulfonate group.

The resulting dispersion was filtered through a 20 μm screen, diafiltered with 15 volumes of deionized water using a Microza ultrafiltration module (SLP-1053) equipped with a 10,000 molecular weight cutoff column, and centrifuged for 30 minutes at 10000 rpm using a Beckman Optima centrifuge with a Type 19 rotor. The properties of the resulting dispersion are shown in the table below:

| | |
|---|---|
| Percent Solids | 9.2 |
| Functionality | $SO_3$ |
| pH | 6.73 |
| Particle Size - mv | 0.127 microns |
| Particle Size - 50% | 0.1168 microns |
| Particle Size - 100% | 0.4088 microns |
| Surface Tension * | 63.81 dynes/cm |

* Surface Tension was measured using a Kruss Digital Tensiometer

The pigment dispersion was used to prepare an aqueous ink jet ink composition. A square test image was produced by printing this ink onto a paper substrate. The image was seen as having tints of red color depending on how the image was viewed. Thus, when viewed head on at a 90 degree angle, the square image was cyan in color. When the image was tipped at an angle, the image took on a reddish color. A multi-color image was also printed using this ink, which also gave similar results, particularly in the sections of the image in which cyan pigment was used. The change in apparent color indicated an authentic image. The image did not show the same visual effects upon copying.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What we claim is:

1. A method of producing an image which comprises the steps of: a) formulating an ink composition comprising a liquid vehicle and at least one modified pigment comprising a pigment having attached at least one organic group, b) applying the ink composition to a substrate, and c) producing an image, wherein the image is visually different from reproductions produced therefrom.

2. The method of claim 1, wherein the organic group comprises at least one ionic group, at least one ionizable group, or a mixture of at least one ionic group and at least one ionizable group.

3. The method of claim 1, wherein the organic group comprises at least one carboxylate group, sulfonate group, or ammonium group.

4. The method of claim 1, wherein the organic group comprises at least one dye.

5. The method of claim 1, wherein the pigment is carbon black, graphite, vitreous carbon, finely-divided carbon, activated carbon, activated charcoal, or mixtures thereof.

6. The method of claim 5, wherein the pigment is carbon black.

7. The method of claim 1, wherein the pigment is a white pigment, a black pigment, a blue pigment, a brown pigment, a cyan pigment, a green pigment, a violet pigment, a magenta pigment, a red pigment, a yellow pigment, shades thereof, or combinations thereof.

8. The method of claim 1, wherein the pigment comprises at least one metal that is not divalent.

9. The method of claim 8, wherein the pigment is aluminum phthalocyanine.

10. The method of claim 1, wherein the ink composition is an ink jet ink composition.

11. The method of claim 1, wherein the vehicle is an aqueous ink vehicle.

* * * * *